(12) United States Patent
Behl et al.

(10) Patent No.: US 10,885,206 B2
(45) Date of Patent: Jan. 5, 2021

(54) PROTECTING ENTERPRISE DATA AT EACH SYSTEM LAYER

(71) Applicant: International Business Machines Corporation, Armonk, NY (US)

(72) Inventors: Dushyant K. Behl, Sangaria (IN); Arvind Seshadri, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 430 days.

(21) Appl. No.: 15/396,565

(22) Filed: Dec. 31, 2016

(65) Prior Publication Data

US 2017/0329979 A1 Nov. 16, 2017

(30) Foreign Application Priority Data

May 10, 2016 (IN) .............................. 201641016304

(51) Int. Cl.
| | |
|---|---|
| *G06F 21/50* | (2013.01) |
| *G06F 21/62* | (2013.01) |
| *G06F 21/60* | (2013.01) |
| *G06F 9/455* | (2018.01) |
| *G06F 21/53* | (2013.01) |
| *G06F 21/74* | (2013.01) |

(52) U.S. Cl.
CPC ........ *G06F 21/604* (2013.01); *G06F 9/45533* (2013.01); *G06F 21/53* (2013.01); *G06F 21/74* (2013.01)

(58) Field of Classification Search
CPC .......... G06F 21/44; G06F 21/51; G06F 21/52; G06F 21/53; G06F 21/57; G06F 21/78; G06F 21/85; H04L 63/20
See application file for complete search history.

(56) References Cited

U.S. PATENT DOCUMENTS

| | | | |
|---|---|---|---|
| 9,326,134 B2 | 4/2016 | Ahuja et al. | |
| 2008/0134177 A1* | 6/2008 | Fitzgerald | ............... G06F 21/51 718/1 |
| 2010/0031325 A1* | 2/2010 | Maigne | ............... G06F 9/45558 726/4 |
| 2011/0296052 A1* | 12/2011 | Guo | ...................... G06F 9/5077 709/240 |

(Continued)

OTHER PUBLICATIONS

Alexander Moshchuk et al., "Content-Based Isolation: Rethinking Isolation Policy Design on Client Systems", CCS'13, Nov. 4-8, 2013, Berlin, Germany, 13 pages, ACM Digital Library.

(Continued)

*Primary Examiner* — Alexander Lagor
*Assistant Examiner* — Kalish K Bell
(74) *Attorney, Agent, or Firm* — Ference & Associates, LLC

(57) ABSTRACT

One embodiment provides a method, including: utilizing at least one processor to execute computer code that performs the steps of: receiving, on an electronic device, a request to execute a system process; determining, using a processor, if the electronic device contains enterprise information; thereafter, identifying, based on the request, that the system process is associated with enterprise information; and granting, to a software platform, restricted access to the enterprise data using a hypervisor. Other aspects are described and claimed.

19 Claims, 2 Drawing Sheets

(56) References Cited

U.S. PATENT DOCUMENTS

| | | | | |
|---|---|---|---|---|
| 2013/0160133 | A1* | 6/2013 | Avgerinos | G06F 21/57 726/26 |
| 2014/0068248 | A1* | 3/2014 | Kobres | G06F 21/82 713/155 |
| 2014/0195927 | A1* | 7/2014 | DeWeese | H04W 12/0027 715/750 |
| 2014/0380405 | A1 | 12/2014 | Forsberg et al. | |
| 2015/0082456 | A1 | 3/2015 | Eren et al. | |
| 2015/0199532 | A1* | 7/2015 | Ismael | G06F 21/552 726/30 |
| 2016/0314299 | A1* | 10/2016 | Almer | G06F 21/6218 |

OTHER PUBLICATIONS

David Lie et al., "Implementing an Untrusted Operating System on Trusted Hardware", SOSP'03, Oct. 19-22, 2003, Bolton Landing, New York, USA, 15 pages, ACD Digital Library.

Ruby B. Lee et al., "Architecture for Protecting Critical Secrets in Microprocessors", ISCA '05, Proceedings of the 32nd International Symposium on Computer Architecture, Jun. 4-8, 2005, Madison, WI, USA, 12 pages, IEEE Computer Society, Washington, DC, USA.

Richard Ta-Min et al., "Splitting Interfaces: Making Trust Between Applications and Operating Systems Configurable", OSDI '06, 7th USENIX Symposium on Operating Systems Design and Implementation, Nov. 6-8, 2006, Seattle, WA, USA, 14 pages, USENIX Association, Berkeley, CA, USA.

Jeffrey S. Dwoskin et al., "Hardware-rooted Trust for Secure Key Management and Transient Trust", CCS'07, Oct. 29-Nov. 2, 2007, Alexandria, Virginia, USA, 12 pages, ACM Digital Library.

Xiaoxin Chen et al., "Overshadow: A Virtualization-Based Approach to Retrofitting Protection in Commodity Operating Systems", ASPLOS '08, Mar. 1-5, 2008, Seattle, WA, USA, 12 pages, ACM Digital Library.

Jisoo Yang et al., "Using Hypervisor to Provide Data Secrecy for User Applications on a Per-Page Basis", VEE '08, Mar. 5-7, 2008, Seattle, WA, USA, 10 pages, ACM Digital Library.

Robert Wahbe et al., "Efficient Software-Based Fault Isolation", SIGOPS '93, 1993, 14 pages, ACM Digital Library.

Ulfar Erlingsson et al., "XFI: Software Guards for System Address Spaces", OSDI '06, 7th USENIX Symposium on Operating Systems Design and Implementation, Nov. 6-8, 2006, Seattle, WA, USA, 14 pages, USENIX Association, Berkeley, CA, USA.

Miguel Castro et al., "Fast Byte-Granularity Software Fault Isolation", SOSP '09, Oct. 11-14, 2009, Big Sky, Montana, USA, 14 pages, ACM Digital Library.

Harry J. Saal et al., "A Hardware Architecture for Controlling Information Flow", ISCA '78, Proceedings of the 5th Annual Symposium on Computer Architecture, Palo Alto, CA, USA, 1978, 6 pages, ACM Digital Library.

G. Edward Suh et al., "Secure Program Execution via Dynamic Information Flow Tracking", ASPLOS '04, Oct. 7-13, 2004, Boston, Massachusetts, USA, 12 pages, ACM Digital Library.

Michael Dalton et al., "Raksha: A Flexible Information Flow Architecture for Software Security", ISCA '07, Jun. 9-13, 2007, San Diego, CA USA, 12 pages, ACM Digital Library.

Nickolai Zeldovich et al., "Hardware Enforcement of Application Security Policies Using Tagged Memory", 8th USENIX Symposium on Operating Systems Design and Implementation, OSDI '08, 17 pages, USENIX Association, Berkeley, CA, USA.

Nickolai Zeldovich et al., "Making Information Flow Explicit in HiStar", OSDI '06, 7th USENIX Symposium on Operating Systems Design and Implementation, Nov. 6-8, 2006, Seattle, WA, USA, 16 pages, USENIX Association, Berkeley, CA, USA.

Petros Efstathopoulos et al., "Labels and Event Processes in the Asbestos Operating System", SOSP '05, Oct. 23-26, 2005, Brighton, United Kingdom, 14 pages, ACM Digital Library.

Nickolai Zeldovich et al., "Securing Distributed Systems with Information Flow Control", NSDI '08, 5th USENIX Symposium on Networked Systems Design and Implementation, Apr. 16-18, 2008, San Francisco, CA, USA, 16 pages, USENIX Association, Berkeley, CA, USA.

Deian Stefan et al., "Flexible Dynamic Information Flow Control in Haskell", Haskell '11, Sep. 22, 2011, Tokyo, Japan, 12 pages, ACM Digital Library.

\* cited by examiner

PROTECTING ENTERPRISE DATA AT EACH SYSTEM LAYER

CROSS REFERENCE TO RELATED APPLICATION

This application claims priority to India Patent Application Serial No. 201641016304, filed on May 10, 2016, and entitled "PROTECTING ENTERPRISE DATA AT EACH SYSTEM LAYER," the contents of which are incorporated by reference herein.

BACKGROUND

Mobile Electronic devices (e.g., smart phones, tablets, laptops, etc.) are more common today than ever before. As the capability of these devices has increased, so has their role in our lives. Actions that would have previously only been carried out on a computer, such as banking, shopping, gaming, etc., are now done on mobile devices. Because of this increase capability, our mobile devices are being granted access to more confidential and important information than ever before. For example, many individuals access their bank account via their mobile devices, and perhaps even save their credentials locally on the mobile device.

Additionally, as the lines between work and home blur for many business focused individuals personal and enterprise information regular end up on the same device. For example, a user may have a personal smart phone or tablet that has access to enterprise information associated with their employment. For example, the user may have their business email received on their device, or may have a virtual private network (VPN) connection the enterprise servers. This can be a cause of concern for businesses as individuals are not as security focused as corporations need to be. This can lead to data exposures cause by weaknesses in the personal aspect of a user's device. For example, a user may mistakenly allow a malicious individual to gain access to their device, and because the user's device has access to enterprise data, the malicious individual now has access to any information available to the worker (e.g., confidential business information).

BRIEF SUMMARY

In summary, one aspect of the invention provides a method comprising: utilizing at least one processor to execute computer code that performs the steps of: receiving, on an electronic device, a request to execute a system process; determining, using a processor, if the electronic device contains enterprise information; thereafter, identifying, based on the request, that the system process is associated with enterprise information; and granting, to a software platform, restricted access to the enterprise data using a hypervisor.

Another aspect of the invention provides an apparatus comprising: an apparatus comprising: at least one processor; and a computer readable storage medium having computer readable program code embodied therewith and executable by the at least one processor, the computer readable program code comprising: computer readable program code that receives, on the apparatus, a request to execute a system process; computer readable program code that determines, using a processor, if the apparatus contains enterprise information; computer readable program code that thereafter, identifies, based on the request, that the system process is associated with enterprise information; and computer readable program code that grants, to a software platform, restricted access to the enterprise data using a hypervisor.

An additional aspect of the invention provides a computer program product comprising: a computer readable storage medium having computer readable program code embodied therewith, the computer readable program code comprising: computer readable program code that receives, on an electronic device, a request to execute a system process; computer readable program code that determines, using a processor, if the electronic device contains enterprise information; computer readable program code that thereafter, identifies, based on the request, that the system process is associated with enterprise information; and computer readable program code that grants, to a software platform, restricted access to the enterprise data using a hypervisor.

A further aspect of the invention provides a method comprising receiving, from a peripheral device, a request to execute a system process; identifying, based on the request, that the system process is attempting to access non-enterprise information; identifying, based on the request, that the system process is attempting to access enterprise information; and restricting the system process to one of: the non-enterprise information and the enterprise information using at least one of: firmware and hardware.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
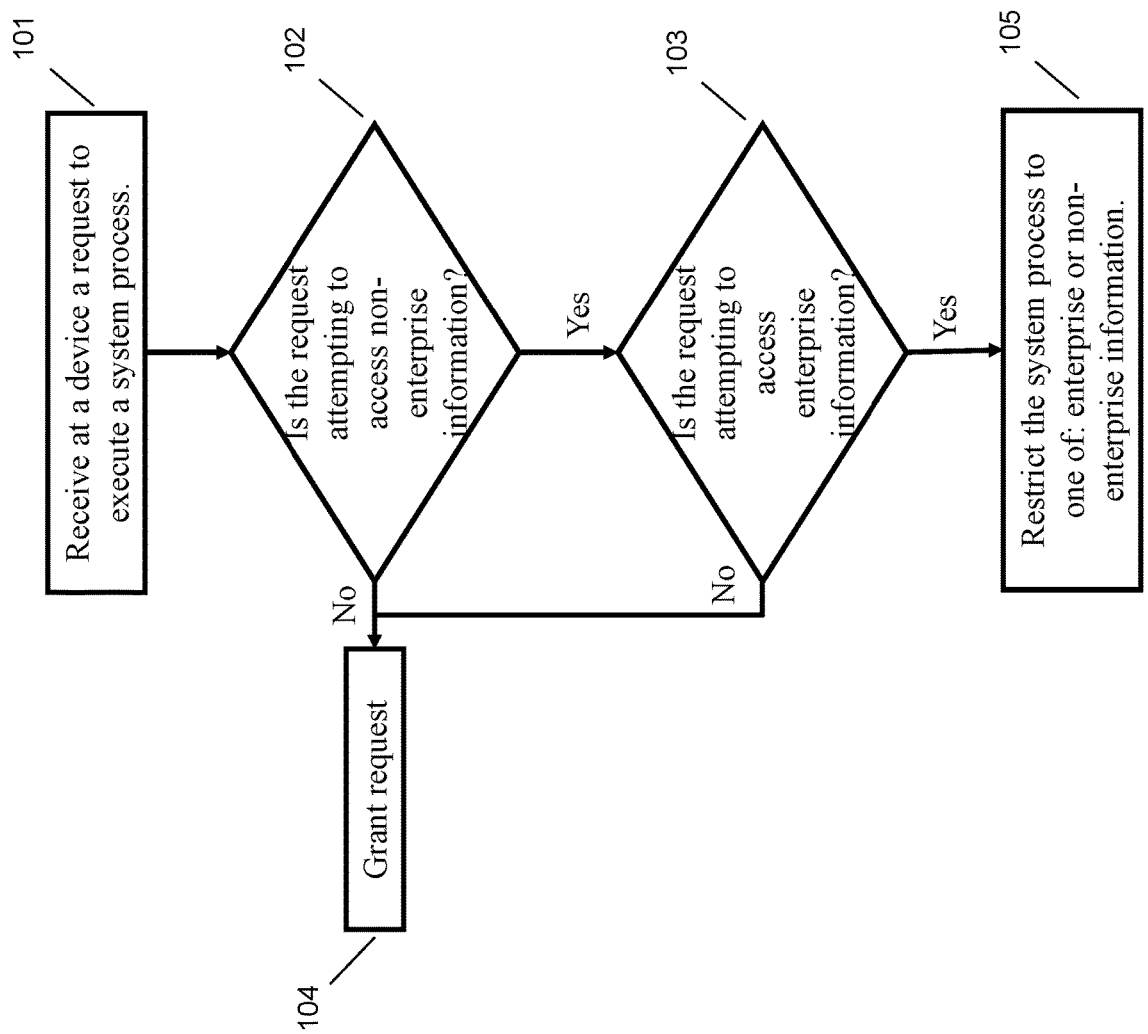
FIG. 1 illustrates an example method of protecting enterprise data at each system layer.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIG. 1. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, most if not all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

As discussed herein, vulnerability of a user device can lead to vulnerability of enterprise data. This is because vulnerable shared software stacks generally processes enterprise and non-enterprise data concurrently. Thus, vulnerabilities are present in every layer of the stack. Because most operating system (OS) kernels are monolithic (i.e. entire executable runs inside a single address space). Malicious data can craft attack to exfiltrate enterprise data as well as non-enterprise data.

Enterprises are increasingly embracing the Bring Your Own Device (BYOD) paradigm, where employees can use their personal devices, especially mobile devices, for official work. However, this scenario can create a vulnerable software stack on a mobile device that concurrently processes both enterprise and non-enterprise data. Because vulnerabilities could be present in every layer of the software stack (including applications provided by the enterprise), a remote adversary could craft malicious non-enterprise data flows to compromise one or more software layers, and thereby steal enterprise data.

Attacks may compromise multiple layers simultaneously, thus the problem becomes how to craft an approach that guarantees confidentiality of enterprise data when no layer of the stack can be trusted, because they do not operate in isolation. As stated, most OS kernels operate inside a single address space, thus, device hardware functions according to a stated functional specification.

Because the mobile user (e.g., employee) is trusted not to exfiltrate a company's enterprise data, most security protocols and protections are circumvented because insider attacks are not typically addressable. Therefore, when a remote attacker can exploit vulnerabilities in the Virtual Machine Manager (VMM), OS kernel, and applications typical security measures are ineffective. Malicious or compromised code may collude arbitrarily. Thus, an attacker may be able access enterprise data via explicit reads to locations containing data.

An attacker may not need to infer data values as a function of a shared execution state (e.g., no implicit channels may be required). Moreover, an attacker may not use side or covert channels to infer data. In one embodiment, an application may execute with OS or VMM privilege. In a further embodiment, the OS kernel could execute with VMM privilege. Thus, arbitrary privilege escalation attacks are made possible. Because the application layer can collude with the OS kernel and the VMM to exfiltrate data, no specific layer can be trusted during a potential attack.

Because each layer of software execution may be compromised, an embodiment may only rely on hardware and firmware to ensure security. Thus, an embodiment may provide a holistic approach that protects the confidentiality of any enterprise data across all layers of the software or stack. This allows an embodiment to ensure security even when the OS kernel and applications are malicious and can collude without requiring any hardware modifications.

Thus, an embodiment provides a technical improvement to mobile devices by ensuring that enterprise data cannot be stolen, even if the enterprise data is mixed with non-enterprise data, whose handling is unmodified for privacy reasons. In one embodiment, a combination of memory permissions is used to modify the parameters of any and all system calls (e.g., the approximately four hundred systems calls of a typical Linux Kernel), and control of data exchanged at the software-peripheral interface. In a further embodiment, data can be freely shared between user processes and processes dealing with enterprise data, without requiring modifications to applications, middleware, and even the semantics of systems calls. In one embodiment, the processing of system calls is left entirely to the kernel and the kernel is permitted to directly manage peripheral devices.

A memory element (ME) as referred to herein, is an architecturally-visible device in a computing system that stores bit strings. Additionally, the term ME refers to an actual hardware device, and not to a logical representation such as virtual memory. Generally, a set of ME(s) may be divided into three disjoint sets: (1) the set of all central processing units (CPU) registers (C), the set of all RAM locations (M), and the set of all peripheral device registers (P). Additionally, the above sets are disjoint in a physical sense i.e., the ME(s) that are part of each uniquely identifiable hardware device in a computing system will fall into one of the three sets.

Logically, an embodiment may use ME(s) in one set as though they belong to another set. For example, an embodiment may use of disk blocks as swap space to extend Random Access Memory (RAM) locations, and the use of RAM locations as graphics memory. The enterprise data set is the set of all ME(s) that hold enterprise data. The non-enterprise data set is the set of all ME that do not hold enterprise data. It should also be understood, that the term code stack or stack as used herein is in reference to the set of all software (other than firmware) that executes on the CPU of an electronic device. Generally, a code stack consists of the OS kernel, middleware (containing among other things standard libraries, language runtimes, and daemons), and applications.

Generally, the CPU of the mobile device has three modes of execution: (1) an unprivileged user mode, (2) a privileged kernel or supervisor mode, and (3) a privileged hypervisor mode. In this architecture system the hypervisor mode is more privileged than the supervisor mode. Because, as discussed herein, an embodiment may operate in hypervisory mode, it is not required that a code stack execute in kernel mode and user mode. In fact as a consequence of an embodiment operating in hypervisory mode, all execution of the code stack could occur in kernel mode, user mode, or in some combination of both, whichever the attacker deems most advantageous.

In addition to applications installed directly on a mobile device, an embodiment must be able to manage peripheral level attacks. In one embodiment, the contents of a peripheral device ME(s) is transferred into CPU registers or RAM locations before being used as arguments of CPU instructions. Due to the nature of peripheral devices, an embodiment may also classify peripherals into either (1) conduit peripherals or (2) processing peripherals. Conduit peripherals do not perform any computation on the data input to them either from within or outside the computing system. Generally, they only copy or move data; examples include disk, network, and peripheral bus controllers. Processing peripherals perform computation on the data input to them; examples include video and audio hardware. It should be understood by those skilled in the art that a processing peripheral must also be conduit peripheral but the converse is not true.

In one embodiment, all computation on enterprise information takes place within middleware and/or applications. In an additional embodiment, the OS kernel may perform computations (e.g., encryption of data) for performance and security reasons. In a further embodiment, applications and middleware need only read and write to ME(s) in the set M and the set C during for correct execution. Thus, all access to ME(s) in the set P happen via the OS kernel through the system call mechanism.

The CPU an embodiment may have hardware support for virtualization including memory virtualization (e.g., Intel VT-x technology with extended page tables (EPT) and ARM virtualization extensions with Stage 2 page tables). INTEL is a registered trademark of Intel Corporation in the United States of America and other countries. ARM is registered trademark of ARM LLC in the United States of America and other countries. In a further embodiment, the virtualization extensions can be implemented as a separate privilege level or as a separate CPU mode.

One embodiment, may have an input output memory management unit (IOMMU) that can translate addresses issued by peripheral devices for direct memory access (DMA) reading and writing, that can prevent DMA reads or writes or both from peripheral devices to RAM pages. Additionally, in an embodiment, the system physical address map, which states where in the physical address space the CPU, RAM, ROMs, peripheral device registers, etc. are mapped, may be fixed during platform design and/or specified by a device manufacturer in the platform manual.

Additionally, in an embodiment, the inputs to one or more peripheral devices that is required to be transferred to software for executing on the CPU may come from one of four sources: (1) persistent storage locations (e.g., hard disk drive or flash memory sectors), (2) environmental inputs (e.g., image data from cameras, audio data from microphones, movement data from accelerometers and other sensors), (3) user input (e.g., keyboard input, touchscreen input, mouse input, trackpad input, etc.), and (4) other computer systems (e.g., via the network interfaces).

In a further embodiment, the outputs handed to peripheral devices from software executing on the CPU can go to one or more of the following sinks: (1) persistent storage locations (e.g., hard disk drives, flash memory sectors, etc.), (2) display, and (3) other computer systems (e.g., via the network interfaces). In order to transfer data between the software executing on the CPU and the peripheral devices, an embodiment may use one of: (1) DMA reads or writes from RAM locations, and/or (2) reads or writes of peripheral device registers by software resulting in data being transferred between CPU registers or RAM locations, and peripheral device registers.

In one embodiment, peripheral device registers are accessed via the memory-mapped input output (MMIO) mechanism only, and not via port-based input output. Additionally, an embodiment may be extended to take care of port-based input output. In another embodiment, data may only be transferred between peripheral devices using the CPU as an intermediary (e.g., there is no facility for peer-to-peer data transfer between peripheral devices).

Moreover, in an embodiment, peripheral devices may not copy all or part of data written to them from CPU/RAM registers or received by them from external sources or control registers. Asserting a reset on a peripheral device may, in an embodiment, reset all its architecturally-visible registers to their reset values, as defined by the device manufacturer.

Based on the factors and characteristics discussed herein, an embodiment will attempt to keep implementation as small as possible to aid formal verification and reduce attack surface. This may done to in an effort to ensure a hardware change is required or that modifications to applications and middleware may be required. An embodiment may also keep security mechanisms transparent to the user to eliminate cognitive load and prevent user errors.

Thus, if a component of the code stack has read access to ME(s) in the enterprise data set in unencrypted (e.g., plaintext) form, then it should not have write access to ME(s) in the non-enterprise data set. Additionally, if a component of the code stack has write access to the ME(s) in the non-enterprise data set then it should not have read access to ME(s) containing plaintext enterprise data.

By way of non-limiting example, an embodiment may exist where it is operating in a state where either there is no enterprise data on the device, or if present, it is only present as encrypted data in persistent storage locations. Also, data input sources other than persistent storage location may be environmental inputs, user inputs, and network inputs, which need not be treated as enterprise data sources. In this state, no action needs to be taken by an embodiment. When in this state, an embodiment must transfer enterprise data into RAM locations or CPU registers for processing. This happens as a result of instructions executed by software running on the CPU.

In a further embodiment, any data obtained as an input from any peripheral device must be uniquely identifiable as belonging to the enterprise or not. As discussed herein, peripheral devices can be classified into conduit peripherals and processing peripherals. Based on this classification, an embodiment may make the following observations: (1) data output to a conduit peripheral by software executing on the CPU can be encrypted without compromising execution integrity, (2) data input to a conduit peripheral from outside the physical boundaries of the mobile device will be encrypted only if at least one entity in the chain supplying the data encrypts the data, and (3) data input to a processing peripheral either from software executing on the CPU or from outside the physical boundaries of the mobile device cannot be encrypted without compromising execution integrity as processing peripherals cannot compute on encrypted inputs. Based on these observations, an embodiment may set the following requirements for ensuring confidentiality of enterprise data present in ME(s) of the set P.

Firstly, an embodiment may ensure all enterprise data transferred from ME(s) in the sets C and M to ME(s) of conduit peripherals is encrypted. In addition, an embodiment may ensure that no component of the code stack can read the ME(s) of peripheral devices containing plaintext enterprise data. Assuming the above, in one embodiment, the only CPU modes available to the code stack are kernel mode and user mode. Thus, a further embodiment may only permit software executing in the user mode of the CPU to read the ME(s) of the set M containing enterprise data. Another embodiment, may then prevent software executing in the kernel mode of the CPU from reading the ME(s) of the set M containing enterprise data. An embodiment may also prevent software executing in the user mode of the CPU from reading any ME physically or logically associated with one or more peripheral devices.

Additionally, when a user execution context processing enterprise data transfers the CPU to kernel mode, an embodiment may save and zero out all CPU registers except those containing system call parameters. A further embodiment may modify the system call parameters passed by user mode software executing with enterprise data to the kernel mode. By doing this, the embodiment ensures that reads of the system call parameters do not compromise confidentiality of enterprise data while preserving the semantics of the system calls. Given that in a non-malicious code stack, applications and middleware execute in the user mode of the CPU and the OS kernel executes in the kernel mode, the above embodiments are sufficient to ensure correct execution for a non-malicious stack.

Regarding the management of peripheral devices, an embodiment may incorporate all device handling, and therefore device drivers and only allow the code stack access to devices via hypercalls. However, this approach may cause the code size of an embodiment to be overly burdensome.

Therefore, another embodiment may tag input data (e.g., network data), based on one or more assumptions. Persistent storage tagged at file granularity and flags in file system metadata may indicate enterprise files. Peripherals that provide environmental data input (e.g., microphone, camera, etc.), and user input (e.g., keyboard, touchscreen, trackpad, etc.) are tagged at device granularity. Thus, at any given time, all input from these classes of peripherals are treated as enterprise or not.

One embodiment may communicate directly with a special-purpose application via a hypercall to enable user tagging. Thus, a user may select peripherals to be tagged as enterprise and awaits confirmation from an embodiment that tagging is successful before proceeding. Application memory is thus protected and trusted path terminology between application and embodiment exists because the embodiment intercepts all user to kernel switches. In a further embodiment, an application disk binary image is encrypted, thereby protecting the integrity before it is executed by the kernel. A kernel can only perform denial of service (DoS) attacks (e.g., by not scheduling the app when requested).

Once a user has tagged a peripheral as enterprise, an embodiment may request the kernel to cease all input output to the selected peripheral, reset peripheral, and report the condition by returning. An embodiment may then un-map all MMIO registers from the kernel space and map it into address space. An embodiment then resets the device and request the kernel to perform a post-reset initialization of the device and return. Thus, any reads and writes performed by kernel to the device MMIO registers will trap to the embodiment. An embodiment then performs the reads after verifying that the kernel is not attempting to read device data registers (because they are assumed to contain enterprise data). Based on the aforementioned steps, an embodiment then has the kernel return a message after initializing device to inform user that peripheral is now tagged as an enterprise peripheral.

An embodiment may also use direct memory access (DMA) for data transfer. Accordingly, an embodiment requests the kernel to cease all input output to a selected peripheral and report this condition by returning. Similar to above, an embodiment them un-map all MMIO registers from the kernel space and map it into address space. An embodiment then resets the device and request the kernel to perform a post-reset initialization of all device functions except DMA and return. Thus, any reads and writes performed by kernel to device MMIO registers will trap to the embodiment. An embodiment then performs the reads after verifying that the kernel is not attempting to read device data registers (because they are assumed to contain enterprise data). Based on the aforementioned steps, an embodiment then performs DMA initialization of the device by setting up appropriate control structures in its own memory and programming the DMA specific registers of the device and informs the user that peripheral is now tagged as an enterprise peripheral.

An embodiment may also use encrypted data in combination with DMA. For simplicity purpose, details below assume a single page in handled. It should be clear to one skilled in the art how to extend the example to multiple pages. First, a kernel may receive encrypted enterprise data via DMA from a peripheral with tag indicating enterprise data. Then, based on tag, the kernel may request decryption of the data. Based on the request, an embodiment then removes R and X permissions for the page in the virtualization page tables for the page, and prevents DMA reads and writes to the page via the input output memory management unit (IOMMU) page tables. A further embodiment may then flush the memory management unit (MMU) table and the IOMMU table. Once the MMU and IOMMU have been flushed, an embodiment may add the intermediate physical address (IPA) of the page to the enterprise set, perform the decryption and return to the kernel.

As part of adding page addresses to the DMA scatter-gather list, a kernel may call on an embodiment to request for DMA read permissions to enterprise pages. An embodiment then checks to see if the page is in enterprise set, and if not returns and error. If the page is in the enterprise set, an embodiment may encrypt the page contents and make a virtualization page table entry translating the IPA invalid. Thereby ensuring the code stack cannot read or write the contents of the page. An embodiment then grants DMA read permissions in the IOMMU page table entry translating the IPA, flushes the MMU table and IOMMU table, and returns.

For non-encrypted data and DMA when an entire peripheral has been tagged enterprise, all DMA happens to and from memory. Once again for simplicity purposes, the below steps assume a single page of data is being transferred via DMA, as extension to multi-page transfers would be straightforward to one skilled in the art. Firstly, a kernel requests an embodiment to set up DMA transfer of data from the device into RAM. An embodiment then programs the DMA using a physical page in memory as the target. After a period of time, an embodiment may receive an interrupt from a device indicating completion of the DMA. Thereafter, an embodiment may create a mapping for the page in the virtualization page tables, and remove R and X permissions for the page. The page may then be added to the enterprise data set. An embodiment then flushes the MMU table and returns the IPA of the page to the kernel.

A kernel may call an embodiment with IPA of a page from which data is to be sent to the peripheral via DMA. An embodiment then marks the virtualization page table entry translating the IPA invalid, ensuring that the code stack cannot read or write the contents of the page. Thereafter, the embodiment flushes the MMU table, programs the DMA using the physical address corresponding to the IPA, and returns, For non-encrypted Data and Memory Mapped Input Output (MMIO), a Kernel calls on an embodiment requesting to send or receive data from a peripheral passing as parameter an IPA that contains data to be sent or the receive buffer. An embodiment then checks if the IPA is in the enterprise IPA set, and if not adds the IPA to the enterprise IPA set, adds a translation entry for the IPA in the virtualization page table, removes R and X permissions, and flushes the MMU table. An embodiment may then write the data to the MMIO send register or read data from the MMIO receive register of the peripheral and returns.

Regarding memory protections, an embodiment utilizes a virtual machine monitor (VMM) to virtualize physical memory, with the result that the physical addresses used by a virtual machine (VM) could be different from the physical addresses that are sent on the memory bus. Therefore, the VMM needs to translate a VM's physical addresses (e.g., the intermediate physical addresses (IPA)) to the physical addresses sent on the memory bus (e.g., the system physical addresses (SPA)). A CPU with virtualization support may then provide a separate set of page tables for this purpose (e.g., the stage 2 page tables). The page tables maintained by the kernel in a VM for translating virtual addresses to IPA(s) may be called stage 1 page tables. The stage 2 page tables map memory at the granularity of a page and each page has read (R), write (W), and execute (X) permissions. The permissions used by the CPU for accessing a page are the more restrictive of those in the stage 1 and stage 2 page tables.

With regard to memory protection, an embodiment uses stage 2 page tables to set memory permissions over intermediate physical addresses page frames. The stage 2 page tables are then set for a one-to-one translation of IPA to SPA (e.g., each IPA has a unique SPA, thus IPA aliasing is not possible).

A further embodiment, as discussed herein, may internally maintain a data structure called the enterprise data set. This set contains all the IPA(s) that contain enterprise data, with a bit indicating if the IPA belongs to a user process or the kernel. In one embodiment, it is the SPA page frames that hold data. This means that ideally the SPA containing enterprise data should tracked. However, tracking IPA(s) may be insufficient. This is because the one-to-one translation of IPA(s) to SPA in the stage 2 page table ensures that there can be no aliasing of multiple IPA(s) to the same SPA.

By way of specific example, permission handling may be described in three stages: (1) the first time a user process tries to read enterprise data, (2) when a user process that has already read enterprise data in the past is re-started as a result of the kernel's return to user mode, and (3) handling of enterprise data when the kernel executes enterprise data enters RAM via peripherals. An embodiment may mark pages containing enterprise data read-only in stage 2 page tables.

Thus, any attempt to read causes a permission fault. This fault indicates if it occurs in user mode or kernel mode. If the fault occurred in user mode, then a user process is attempting to read or compute with enterprise data for the first time. Based on this determination, an embodiment may take the following steps. First, an embodiment may walk the stage 1 page tables of this user process using the CPU's page table pointer. Then an embodiment may add to the enterprise data set all the IPA(s) whose user/supervisor bit is set to user in the stage 1 page tables. It may also, record the status of the user/supervisor bit in the enterprise data set. Then, for each IPA in the enterprise data set, an embodiment may give R, W, and X permissions in the stage 2 page tables. An embodiment then marks all of the state 2 translation entries of all IPA(s) not given R, W, and X permissions in the previous step invalid (e.g., both kernel and MMIO IPA(s)). The tables is then flushed and the embodiment returns.

When a user process that has previously read enterprise data is switched into, an embodiment may perform the steps of: walk the stage 1 pages tables of this user process using the CPU's page table pointer; check whether each IPA in the page table whose user/supervisor bit is set to user is present in the enterprise data set; and if an IPA is not present, add it to the set along with the status of the user/supervisor bit. Thus, for each IPA in the enterprise data set, an embodiment may give R, W, and X permissions in the stage 2 page tables and mark all the stage 2 translation entries of all IPA(s) not given R, W, and X permissions in the previous step invalid. (e.g., both kernel and MMIO IPA(s)). The tables is then flushed and the embodiment returns. When a kernel executes a process, an embodiment may mark all IPA(s) in the enterprise data set W in the stage 2 page tables, mark all other IPA(s) R, W, and X and valid, flush the tables, and return One embodiment does not identify individual user processes. Instead, each process that has previously read an enterprise IPA will receive similar permissions. This allows data sharing between enterprise processes. Additionally, the first time a process tries to read an enterprise IPA all the IPA(s) in its stage 1 page table automatically get marked as enterprise IPA(s). In a further embodiment, when any enterprise user process executes, it can read, write, and execute, all user IPA(s) with enterprise data. However, it cannot access either kernel IPA(s) or MMIO IPA(s). Additionally, any IPA that an enterprise user process can access will be in included in the enterprise data set.

In another embodiment, when a kernel executes, no IPA containing enterprise data will be readable. Thus, virtual address aliasing (e.g., multiple virtual addresses mapping to the same IPA) will not have an effect because an embodiment sets permissions on IPA page frames. Moreover, one-to-one translation of IPA(s) to SPA(s) in the stage 2 page tables ensures that each SPA is accessed with exactly one set of stage 2 permissions.

When handling in-kernel copying of enterprise data, a kernel does not read permissions to enterprise IPA. Instead, an embodiment performs a copy on behalf of kernel. In order to know the source to copy from, an embodiment may rely on two characteristics: destination and size to be copied. For the strcpy( ) family of functions in the kernel, an embodiment may identify a function by faulting the kernel program counter and reading the parameters off the kernel stack. Otherwise, an embodiment may fall back to disassembling the faulting instruction in order to learn the source via destination and size of copy.

One embodiment may translate virtual address of destinations to an IPA using kernel's stage 1 page tables. Then, if the IPA of a destination address is not in the enterprise IPA set, it is added to the enterprise IPA set and set with a user/supervisor flag of the corresponding entry to supervisor. An embodiment may then perform the copy and return functions, thereby handling system call parameters.

In an embodiment, there may be at least three types of parameters for system calls: (1) those generated by a kernel and passed to a user space as a return value of a previous system call (e.g., file descriptors, etc.), (2) those generated and passed from a user space to a kernel (e.g., virtual addresses, array counts, etc.), and (3) constants defined in the system call specification (e.g., system call numbers, flags, etc.). Generally, types (1) and (3) are straightforward: for (1) an embodiment may check if a value being passed from user to kernel was previously returned to user by kernel, and for (3) an embodiment may check if a constant being passed is appropriate for a system call as defined by the sys call specification. Types (2) however, needs to be transformed in a manner that will not affect the semantics of the system call involved as because there is no way to verify its value.

A non-limiting list of semantic system call parameters maybe: indices into kernel data structures (e.g., pid, gid, fd, etc.); pointers with virtual addresses (passed from user to kernel, and from kernel to user); user and group identifications (IDs); time parameters (e.g., timers, sleep, timeouts, etc.); major and minor device numbers; file offsets; array counts; file system pathnames; name strings (e.g., host name, network name, process name, etc.); scheduling priorities (e.g., nice values, etc.).

Thus, an embodiment, as discussed herein, broadly provides a method for protecting enterprise data at each system layer. The method comprising receiving, on an electronic device, a request to execute a system process at 101. Once the request is received, an embodiment analyzes it to determine if the system process is attempting to access non-enterprise information at 102. If it is determined that the request is not accessing non-enterprise information, then it can be inferred that it is only accessing enterprise information and the request may be granted at 104. However, if the system process does require access to non-enterprise data, an embodiment further checks to determine if the system process also needs access to enterprise information at 103. If the determination is made that the system process does not need access to enterprise information, and thus only needs to access non-enterprise information, the request can be grated at 104. Alternatively, if it is determined that the system process requires access to both non-enterprise information at 102 and enterprise information at 103, an embodiment may restrict the system process to only one of the requested data sets at 105.

Figure 2:
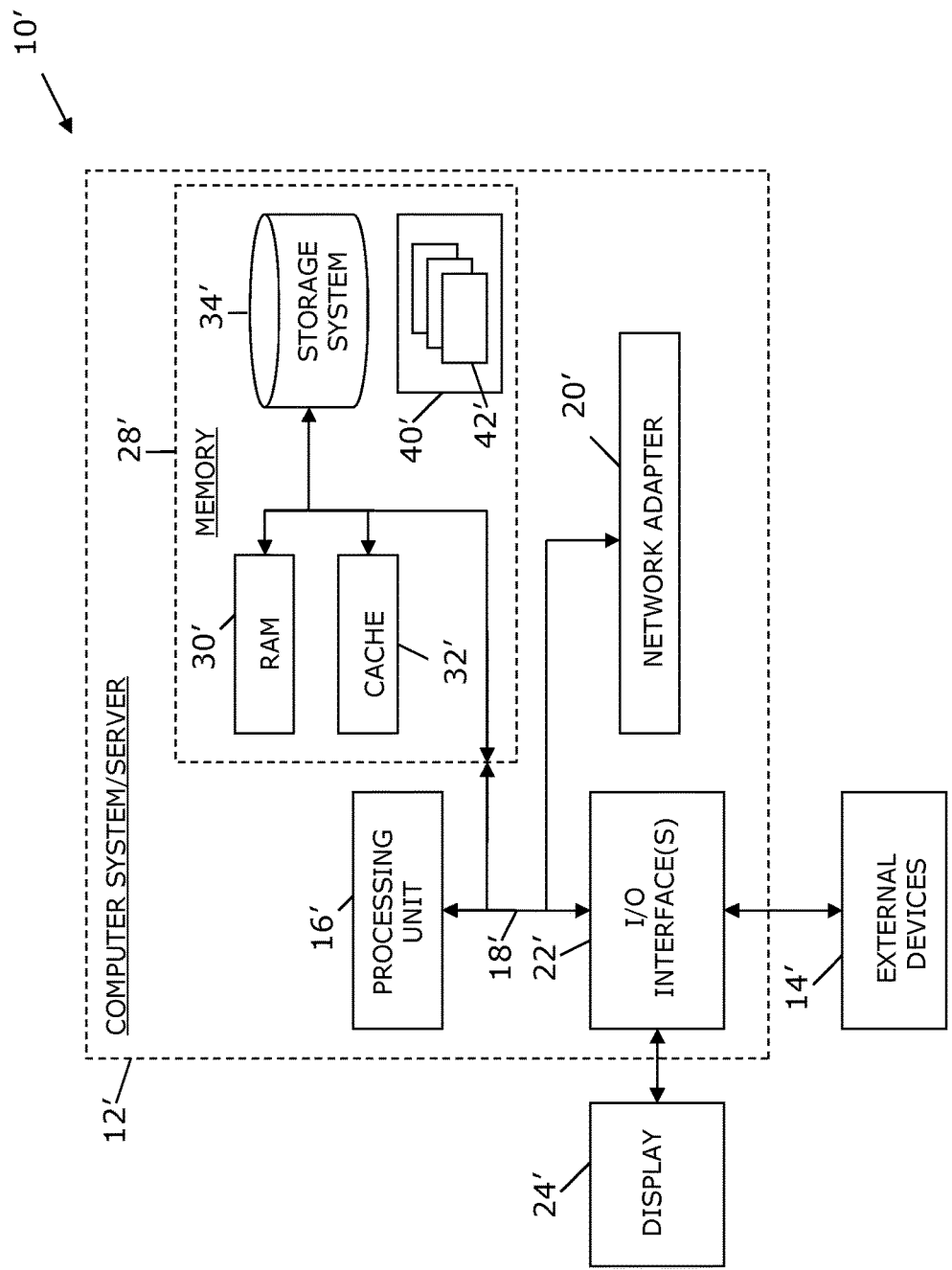
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
utilizing at least one processor to execute computer code that performs the steps of:
receiving, on an electronic device containing both enterprise and non-enterprise information, a request to execute a system process, wherein the enterprise and non-enterprise information is stored within a plurality of memory elements, wherein the plurality of memory elements comprise central processing unit registers, memory locations, and peripheral device registers;
thereafter, identifying, based on the request, that the system process is associated with enterprise information; and
granting, to a software platform and based upon the system process being associated with enterprise information, restricted access to enterprise data using a hypervisor, wherein the granting comprises granting access to the operating system kernel for performing the system process via a system call mechanism, wherein the hypervisor permits a privileged execution of a code stack;
preventing a system process associated with the non-enterprise information from gaining access to the enterprise information by: (i) ensuring that each component of the code stack having read access to memory elements in the enterprise data does not have write access to memory elements in the non-enterprise data and wherein a component of the code stack having write access to memory elements in the enterprise data does not have read access to memory elements in the non-enterprise data, (ii) ensuring that access to the peripheral device registers only occurs via the operating system kernel via the system call mechanism using a memory-mapped input output mechanism placed within the operating system kernel, and (iii) clearing central processing unit registers executing a user process on enterprise data upon switching a mode of execution of a central processing unit of the electronic device.

2. The method of claim 1, wherein the software platform comprises at least one of: an operating system kernel and a system application.

3. The method of claim 1, wherein the system process comprises at least one of: reading information from memory, writing information to memory, reading information from disk space, writing information to disk space, executing an action on information in memory, and executing an action on information in disk space.

4. The method of claim 3, wherein the request is encoded by the hypervisor; and wherein an encoded system process is carried out by an operating system kernel.

5. The method of claim 1, wherein the request originates at a peripheral device.

6. The method of claim 5, further comprising: determining that the peripheral device is associated with the enterprise data.

7. The method of claim 5, wherein the peripheral device comprises a conduit peripheral device.

8. The method of claim 5, wherein the peripheral device comprises a processing peripheral device.

9. The method of claim 1, wherein the hypervisor operates on at least one of a hardware level and a firmware level.

10. An apparatus comprising:
at least one processor; and
a computer readable storage medium having computer readable program code embodied therewith and executable by the at least one processor, the computer readable program code comprising:
computer readable program code that receives, on the apparatus that contains both enterprise and non-enterprise information, a request to execute a system process, wherein the enterprise and non-enterprise information is stored within a plurality of memory elements, wherein the plurality of memory elements comprise central processing unit registers, memory locations, and peripheral device registers;
computer readable program code that thereafter, identifies, based on the request, that the system process is associated with enterprise information; and
computer readable program code that grants, to a software platform and based upon the system process being associated with enterprise information, restricted access to enterprise data using a hypervisor, wherein the granting comprises granting access to the operating system kernel for performing the system process via a system call mechanism, wherein the hypervisor permits a privileged execution of a code stack;
computer readable program code that prevents a system process associated with the non-enterprise information from gaining access to the enterprise information by: (i) ensuring that each component of the code stack having read access to memory elements in the enterprise data does not have write access to memory elements in the non-enterprise data and wherein a component of the code stack having write access to memory elements in the enterprise data does not have read access to memory elements in the non-enterprise data, (ii) ensuring that access to the peripheral device registers only occurs via the operating system kernel via the system call mechanism using a memory-mapped input output mechanism placed within the operating system kernel, and (iii) clearing central processing unit registers executing a user process on enterprise data upon switching a mode of execution of a central processing unit of the electronic device.

11. A computer program product comprising:
a computer readable storage medium having computer readable program code embodied therewith, the computer readable program code comprising:
computer readable program code that receives, on the apparatus that contains both enterprise and non-enterprise information, a request to execute a system process, wherein the enterprise and non-enterprise information is stored within a plurality of memory elements, wherein the plurality of memory elements comprise central processing unit registers, memory locations, and peripheral device registers;
computer readable program code that thereafter, identifies, based on the request, that the system process is associated with enterprise information; and
computer readable program code that grants, to a software platform and based upon the system process being associated with enterprise information, restricted access to enterprise data using a hypervisor, wherein the granting comprises granting access to the operating system kernel for performing the system process via a system call mechanism, wherein the hypervisor permits a privileged execution of a code stack;

computer readable program code that prevents a system process associated with the non-enterprise information from gaining access to the enterprise information by: (i) ensuring that each component of the code stack having read access to memory elements in the enterprise data does not have write access to memory elements in the non-enterprise data and wherein a component of the code stack having write access to memory elements in the enterprise data does not have read access to memory elements in the non-enterprise data, (ii) ensuring that access to the peripheral device registers only occurs via the operating system kernel via the system call mechanism using a memory-mapped input output mechanism placed within the operating system kernel, and (iii) clearing central processing unit registers executing a user process on enterprise data upon switching a mode of execution of a central processing unit of the electronic device.

12. The computer program product of claim 11, wherein the software platform comprises at least one of: an operating system kernel and a system application.

13. The computer program product of claim 11, wherein system process comprises at least one of: reading information from memory, writing information to memory, reading information from disk space, writing information to disk space, executing an action on information in memory, and executing an action on information in disk space.

14. The computer program product of claim 13, wherein the request is encoded by the hypervisor; and wherein an encoded system process is carried out by an operating system kernel.

15. The computer program product of claim 11, wherein the request originates at a peripheral device.

16. The computer program product of claim 15, further comprising:

computer readable program code that determines that the peripheral device is associated with the enterprise data.

17. The computer program product of claim 15, wherein the peripheral device comprises a conduit peripheral device.

18. The computer program product of claim 15, wherein the peripheral device comprises a processing peripheral device.

19. The computer program product of claim 11, wherein the hypervisor operates on at least one of a hardware level and a firmware level.

* * * * *